No. 845,835. PATENTED MAR. 5, 1907.
E. E. WIGHTMAN.
GAS REGULATOR FOR DENTAL VULCANIZERS.
APPLICATION FILED JUNE 7, 1905.
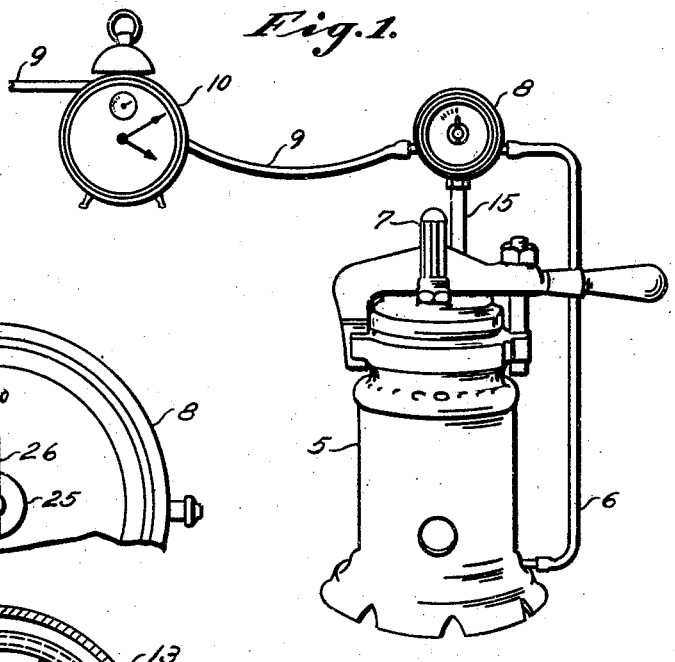
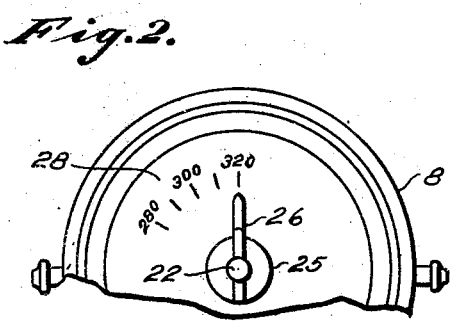
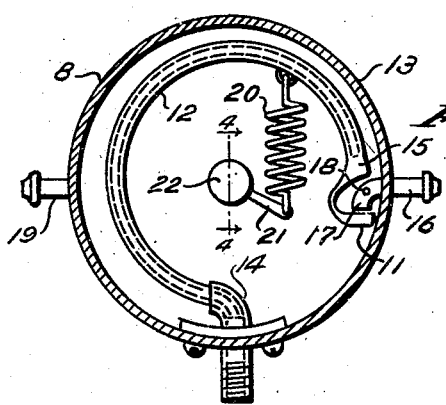
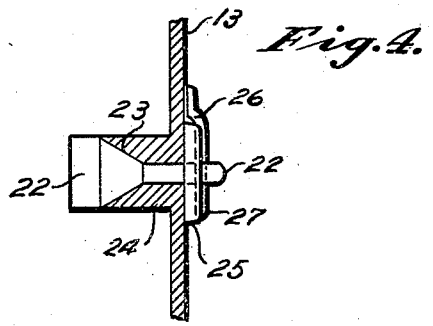
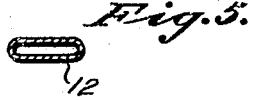
Witnesses: Inventor
Andrew Rummler, Elmer E. Wightman,
Glen C. Stephens, by Rummler & Rummler,
Attorneys.

UNITED STATES PATENT OFFICE.

ELMER E. WIGHTMAN, OF CHICAGO, ILLINOIS.

GAS-REGULATOR FOR DENTAL VULCANIZERS.

No. 845,835.  Specification of Letters Patent.  Patented March 5, 1907.

Application filed June 7, 1905. Serial No. 264,110.

*To all whom it may concern:*

Be it known that I, ELMER E. WIGHTMAN, a citizen of the United States of America, and a resident of Chicago, in the county of Cook and State of Illinois, have invented certain new and useful Improvements in Gas-Regulators for Dental Vulcanizers, of which the following is a specification.

The main objects of this invention are to provide an improved form of gas-regulator adapted to control the supply of gas to the burner of a dental vulcanizer in such manner as to accurately maintain a fixed temperature while the vulcanizer is in operation and to provide a device of this class which may be readily adjusted to various temperatures, which is efficient and accurate in its operation and which is inexpensive, simple, and without parts which could easily get out of order. I accomplish these objects by the device shown in the accompanying drawings, in which—

Figure 1 shows the general arrangement of a dental vulcanizer provided with a gas-controlling device constructed according to my invention. Fig. 2 is an enlarged front elevation, partly broken away, showing the indicator dial and pointer of the regulator. Fig. 3 is a front elevation of the regulator, the casing being broken away to show the interior mechanism. Fig. 4 is a vertical section on the line 4 4 of Fig. 3, showing the construction of the dial-spindle. Fig. 5 is a transverse section of the tube 12.

In the apparatus shown in the drawings, an ordinary dental vulcanizer is represented at 5. This vulcanizer has a clamping apparatus at its upper part which is adapted to contain the molds which hold and shape the rubber composition. A gas-burner in the lower part of the vulcanizer heats a boiler which supplies the steam for heating the rubber during the process of vulcanization. The pipe 6 supplies gas to the burner, and the thermometer 7 indicates the temperature of the steam.

The regulator 8 controls the supply of gas to the supply-pipe 6 of the burner. Gas enters the regulator 8 through the pipe 9, which in turn is controlled by means of a time cut-off mechanism, (indicated at 10 in Fig. 1.)

The principal features of this invention are the valve 11, which is arranged to open and close through the expansion and contraction of a flattened curved tube 12 under the action of the steam-pressure of the vulcanizer, together with means for varying an effect of the pressure of the steam upon said tube, so as to cause the valve to close at a desired predetermined pressure. In the construction shown in the drawings the casing 13 of the regulator 8 is a flat cylindrical gas-tight receptacle, within which the flattened curved tube 12 is mounted, as in the well-known form of pressure-gage. One end of the tube 12 is rigidly secured to the casting 14, which extends through the bottom of the casing 13 and is externally threaded for connection with the pipe 15, communicating with the steam-compartment of the boiler. The tube 12 is bent to circular curvature, and its cross-section is elliptical with the long diameter disposed at right angles to the plane of curvature of the tube. The end 15 of the tube 12 is closed and has rigidly mounted thereon the valve 11. The nipple 16, which extends through the side of the casing 13 and connects with the gas-supply pipe 6, is curved downwardly within the casing, and its lower end 17 forms a seat for the valve 11. The nipple 16 is provided with a small aperture 18, which forms a by-pass passage to admit a certain minimum quantity of gas to the supply-pipe 6 when the valve 11 is firmly held against its seat. This prevents the gas-flame in the burner from becoming entirely extinguished through the action of the regulator. The valve 11 moves toward and away from its seat 17 through the well-known tendency of the tube 12 to assume its normal curvature when not under pressure and to tend to expand or straighten out when the fluid contained therein is under pressure. Gas is supplied to the interior of the casing 13 through the inlet-passage in the nipple 19, which connects the casing with the pipe 9.

In order to provide for regulating the closing of the valve 11 and permitting the operator to adjust the valve so as to cause the same to close at a desired predetermined temperature of the steam, the straightening tendency of the tube 12 may be resisted by means of the spring 20. This spring connects the free end of the tube 12 with the arm 21 of the dial-spindle 22. The spindle 22 is enlarged at its inner end and is provided with a conical shoulder 23, fitting a conical seat in the hub 24 of the casing. The spindle 22 extends through a washer 25 on the outside of the casing and is held in position by means of the dial-pointer 26, which is seated in a groove in the washer 25, and extends through an aperture in the spindle 22. One end 27 of the pointer 26 is slightly wedge-shaped, so that when the pointer is pushed into position along the groove in the washer 25 it will tend to draw the conical shoulder 23 into frictional contact with the conical seat in the hub 24. This friction furnishes resistance to the rotation of the spindle 21, so that the same may be set to vary the tension of the spring 20.
The dial-face 28 of the casing 13 is graduated to indicate the various settings of the pointer 26. The graduations shown correspond to the pressure of steam which will cause the closing of the valve 11 and are preferably indicated by the temperature of the steam corresponding to such pressures. Those indicated are from 280° to 320° Fahrenheit, which are the temperatures which are usually used in vulcanizing rubber for dental purposes.
The temperature of the steam is also indicated by the thermometer 7, so that the operator may readily observe whether or not the regulator is properly adjusted.

The time mechanism 10 is provided to permit the gas to be automatically cut off entirely after a certain period of operation.

The operation of the device shown is as follows: As the temperature of steam in the boiler rises its pressure also increases and the effect of such increase of pressure on the flattened curved tube 12 is to cause the tube to tend to straighten out, and thereby draw the valve 11 toward its seat. The valve 11 is so located that the tube 12 will seat said valve when the pressure of the steam corresponds to the lowest reading of the indicator, which in the form shown is 280°. Such is the case when the pointer 26 is turned to "280°" on the dial. The arm 21 will then be in such position that the spring 20 will offer no resistance to the straightening tendency of the tube 12. When the pointer 26 is turned to higher graduations, the tension on the spring 20 is increased and causes the valve 11 to become seated at the temperature which corresponds to the graduation to which the pointer 26 is set. The by-pass passage 18 insures that enough gas will always enter the pipe 6 to maintain a flame at the burners when the valve 11 is seated. The flame of the burner when gas is supplied only through the by-pass aperture 18 is too small to maintain the necessary high temperature of the steam, and the tendency of the pipe 12 is to seat the valve 11 as soon as the desired temperature is exceeded. In this way it will be seen that the valve 11 will automatically assume a position which will maintain the steam at a temperature corresponding to the setting of the pointer 26 on the dial. The time mechanism is provided, so that the device will automatically stop after a certain period of operation without special attention from the operator.
It will be seen that some of the details of the construction shown may be altered without departing from the spirit of my invention.

What I claim as my invention, and desire to secure by Letters Patent, is—

1. A gas-regulator, comprising a casing having an inlet and an outlet passage, a Bourdon tube and valve controlling one of said passages, a shaft connected to said tube, adapted, through its radial position, to vary the resistance of said tube, and extending transversely of the plane in which the tube is curved, to the outside of the casing, said shaft having a conical shoulder inside of the casing, and said casing having on the inside an oppositely-formed seat for receiving said shoulder, a dial surrounding the shaft on the outside of the casing, and a wedge engaging the shaft, acting transversely thereof, and bearing upon the outside of the casing, adapted to draw the conical part of the shaft against its seat so as to prevent rotation, and adapted, in connection with said dial, to indicate the pressure at which said tube will operate said valve.

2. A regulator of the class described, comprising a casing having inlet and outlet passages, a valve controlling one of said passages, the walls of said casing being substantially gas-tight, a curved tube mounted within the casing, being secured thereto at one end and having its other end connected with said valve, a pipe for supplying said tube with fluid under pressure, said tube being of elliptical cross-section and adapted to tend to straighten under the pressure of said fluid, and being so connected with said valve, that pressure on said fluid causes the end of said tube to close said valve, a shaft connected to said tube, extending to the outside of the casing, and adapted through rotation to vary the resistance of said tube to said pressure, said shaft having a shoulder bearing against the inside of the wall of said casing and a wedge acting transversely of the shaft between the outer part of said shaft and the wall of said casing for drawing said shoulder against said wall to fix said shaft in different positions to which it is rotated, and a dial on the outer face of said wall adapted, in connection with said wedge, to indicate the pressure at which said tube will operate said valve.

3. A regulator of the class described, comprising a casing having inlet and outlet passages a valve controlling one of said passages, a curved tube mounted within the casing, being secured thereto at one end and having its other end connected with said valve, a pipe for supplying said tube with fluid under pressure, said tube being adapted to tend to straighten under the pressure of said fluid, a shaft connected to said tube, extending to the outside of the casing, and adapted through rotation to vary the resistance of said tube to said pressure, said shaft having a shoulder bearing against the wall of said casing, and a wedge acting transversely of the shaft between the outer part of said shaft and the wall of said casing for drawing said shoulder against said wall to fix said shaft in different positions to which it is rotated.

4. A regulator of the class described, comprising a casing having inlet and outlet passages a valve controlling one of said passages, a curved tube mounted within the casing, being secured thereto at one end and having its other end connected with said valve, a pipe for supplying said tube with fluid under pressure, said tube being adapted to tend to straighten under the pressure of said fluid, a shaft connected to said tube, extending to the outside of the casing, and adapted through rotation to vary the resistance of said tube to said pressure, said shaft having a shoulder bearing against the wall of said casing, said wall having on its outer face a dial surrounding said shaft, and a pointer connected to the outer part of said shaft, extending transversely thereof, and adapted to draw said shoulder against said wall to prevent the rotation of the shaft.

Signed at Chicago this 5th day of June, 1905.

ELMER E. WIGHTMAN.

Witnesses:
E. A. RUMMLER,
GLEN C. STEPHENS.